(12) United States Patent
Nakahara et al.

(10) Patent No.: US 7,825,559 B2
(45) Date of Patent: Nov. 2, 2010

(54) ROTATING MACHINE

(75) Inventors: Akihito Nakahara, Hitachi (JP);
Kazuhiko Takahashi, Hitachi (JP);
Mamoru Kimura, Hitachi (JP);
Akitomi Semba, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 11/644,841

(22) Filed: Dec. 26, 2006

(65) Prior Publication Data
US 2007/0145848 A1 Jun. 28, 2007

(30) Foreign Application Priority Data
Dec. 26, 2005 (JP) .............................. 2005-371279

(51) Int. Cl.
*H02K 1/27* (2006.01)

(52) U.S. Cl. ............................. 310/156.48; 310/156.18; 310/156.53

(58) Field of Classification Search .................... 310/48, 310/49, 50, 51, 156.08–156.31, 156.01, 156.07, 310/156.33, 156.48–156.65, 156.38, 269, 310/268, 216.15–216.16
See application file for complete search history.

(56) References Cited

U.S. PATENT DOCUMENTS
5,894,183 A * 4/1999 Borchert .............. 310/216.013

FOREIGN PATENT DOCUMENTS
EP           44987 A2 *  2/1982
JP       09-023599       1/1997

* cited by examiner

*Primary Examiner*—Quyen Leung
*Assistant Examiner*—Eric Johnson
(74) *Attorney, Agent, or Firm*—Antonelli, Terry, Stout & Kraus, LLP.

(57) ABSTRACT

A rotation machine is configured such that permanent magnets and pole shoes holding the permanent magnets at the outer diameter side of the permanent magnets are provided for a rotor, and an outer diameter size (Ra) in the axial end portion of the pole shoe is made smaller than an outer diameter size (Rb) in the axial center portion.

10 Claims, 10 Drawing Sheets

ROTATING MACHINE

BACKGROUND OF THE INVENTION (1) Field of the Invention

The present invention relates to a rotating machine using a permanent magnet.

(2) Description of Related Art

As an example of a conventional rotating machine, JP-A-9-23599 describes a rotating machine which fixes a field permanent magnet by using a pole shoe and a bolt.

As shown in the above described patent document 1, the rotating machine with permanent magnets for a magnetic field source uses the pole shoe and fastens it by the bolt so as to fix a magnet to a rotor. In such a rotating machine, when a large centrifugal force is applied to poles due to the reasons such as a large diameter of the rotor and a rapid rotating speed, displacement and peeling of the pole shoe often occur.

BRIEF SUMMARY OF THE INVENTION

An object of the present invention is to provide a rotating machine capable of preventing displacement and peeling of a pole shoe even when large centrifugal force is applied to a rotor.

One of the characteristics of the present invention is that the rotating machine has a rotor provided with permanent magnets and pole shoes, which holds the permanent magnet at the outer diameter side of the permanent magnets, and an outer diameter size in the axial end portion of the pole shoes are made smaller than an outer diameter size in the axial center portion. Another characteristic of the present invention is that an inner diameter size in the axial end portion of a stator iron core, which is coaxially disposed with the rotor at the outer diameter side of the rotor, is made smaller than an inner diameter size in the axial center portion.

Other characteristics of the present invention will be described in a column of the best mode of carrying out the present invention.

According to the present invention, even when large centrifugal force is applied to the rotor, displacement and peeling of the pole shoes are prevented, and moreover, the reduction in the output can be prevented.

Hereinafter, the best modes of carrying out the present invention will be described based on examples. In FIG. 14 is shown a conventional rotating machine. FIG. 14 is a view of the rotating machine seen from a peripheral direction, in which a magnetic pole is configured by disposing a permanent magnet 2 between a pole shoe 1 and a pedestal 5 formed in a rotor. According to a conventional structure, at any axial position, the outer diameter of the rotor and the inner diameter of the stator are made uniform.

Here, in the conventional rotating machine, there is a problem that when large centrifugal force is applied to the magnetic pole due to the reasons such as a large diameter of the rotor and rapid rotating speed, displacement and peeling of the pole shoes often occur.

Other objects, features and advantages of the invention will become apparent from the following description of the embodiments of the invention taken in conjunction with the accompanying drawings.

DETAILED DESCRIPTION OF THE INVENTION

Example 1

Figure 1:
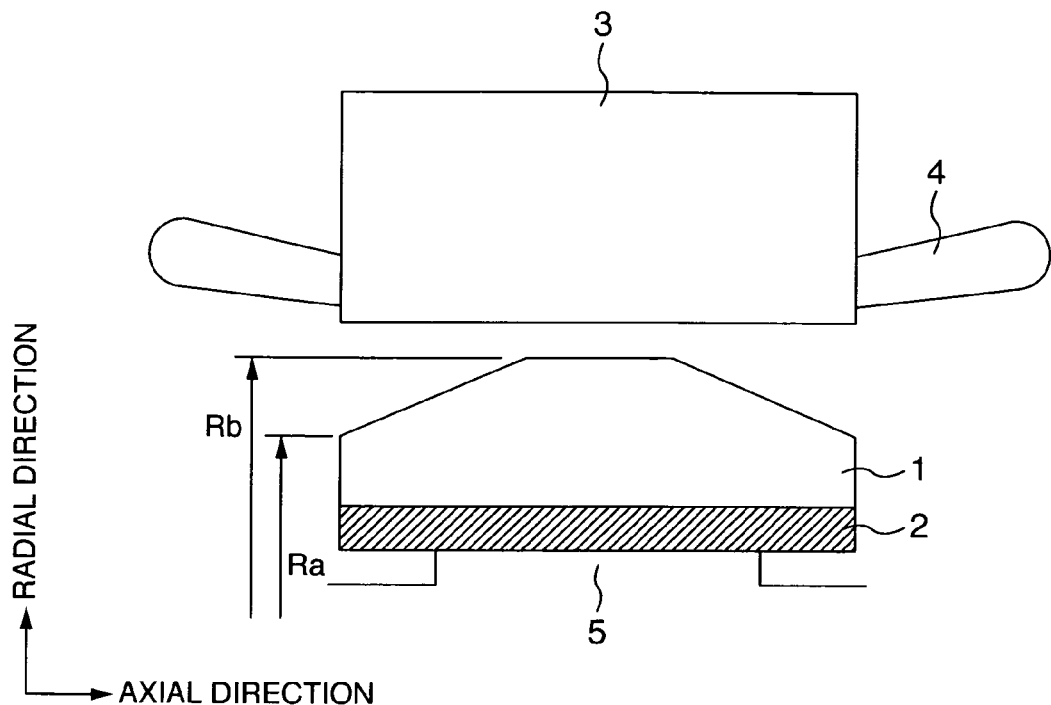
FIG. 1 is a view of a rotating machine of Example 1 of the present invention seen from a peripheral direction.
Figure 8:
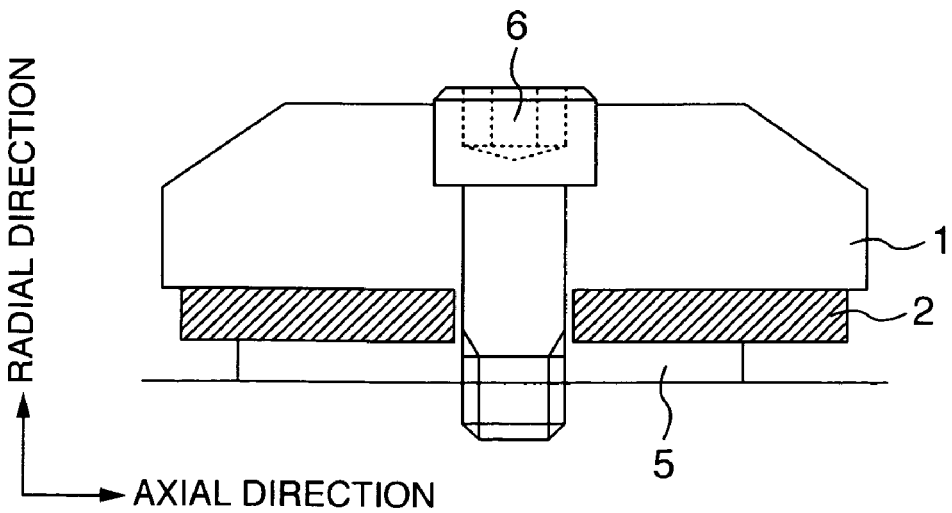
FIG. 8 is a view of a magnetic pole of the rotating machine shown in Example 4 of the present invention seen from a peripheral direction.
Figure 9:
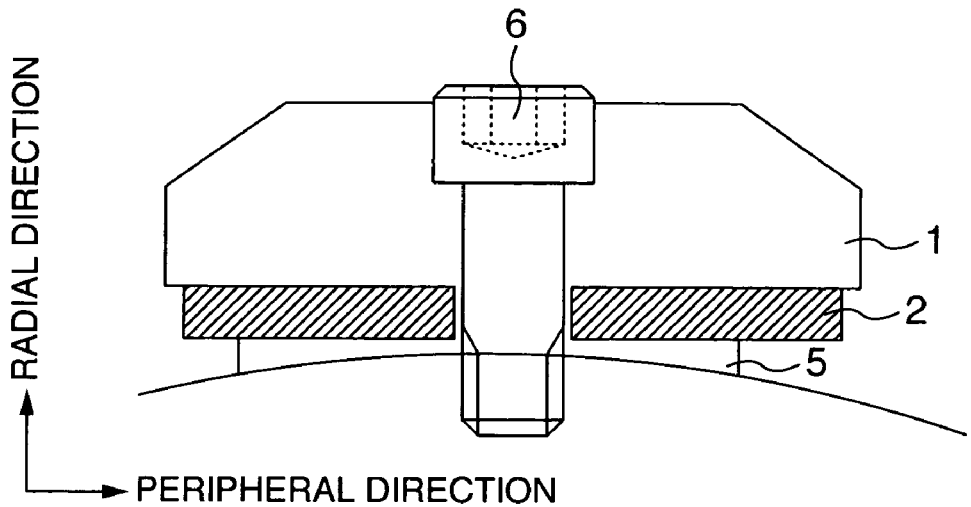
FIG. 9 is a view of a magnetic pole of the rotating machine shown in Example 4 of the present invention seen from an axial direction.

Now, in Example 1 of the present invention, as shown in FIG. 1, magnetic poles are configured by disposing permanent magnets 2 between pole shoes 1 and pedestals 5 formed in a rotor. The pole shoes 1 and the permanent magnets 2 are fixed by fastening by non-magnetic magnetic bolts or winding of a biding band. The permanent magnets 2 is magnetized so as to show radial anisotropy in the radial direction. Incidentally, the pole shoes are configured by a ferromagnetic material such as iron, and efficiently transfers a magnetic flux emitted from the permanent magnet to stator windings. Further, though it is conceivable to provide the permanent magnet on the surface of the rotor, since the rotor rotates at a high speed, it is conceivable that the permanent magnet is deteriorated and flown away. Hence, the permanent magnet is held down by the pole shoes 1 having a hardness from the outside of the permanent magnets. Further, to hold down the permanent magnet from the outside by the pole shoe, as shown in FIGS. 8 and 9, it is fastened and fixed at the center of the pole shoe by a non-magnetic bolt. For this reason, the bolt becomes a point of support at axial both ends, and a distance from the point of support in axial both ends of the pole shoe becomes large, and therefore, a stress is applied to both ends, so that displacement and peeling occur. This creates a problem.

Hence, in the present example, an outer diameter size Ra in both axial ends of the pole shoe 1 is made smaller than an outer diameter size Rb in the axial center portion. As a result, a load at both ends can be reduced, and a stress at both ends is reduced, so that displacement and peeling at both ends of the pole shoe can be prevented.

Incidentally, though it is preferable that a gap between the stator and the rotor be approximately 1% of the diameter of the rotor, when the gap is approximately 1% or more, it is conceivable that the pole shoe 1 is added in order to make the size of the outer diameter larger in the center portion.

Example 2

Incidentally, in Example 1, when the outer diameter of both axial ends of the rotor is made smaller, a gap with the inner diameter of the stator becomes larger, and therefore, there arises a problem that a flux leakage is increased and an output is reduced.

Figure 2:
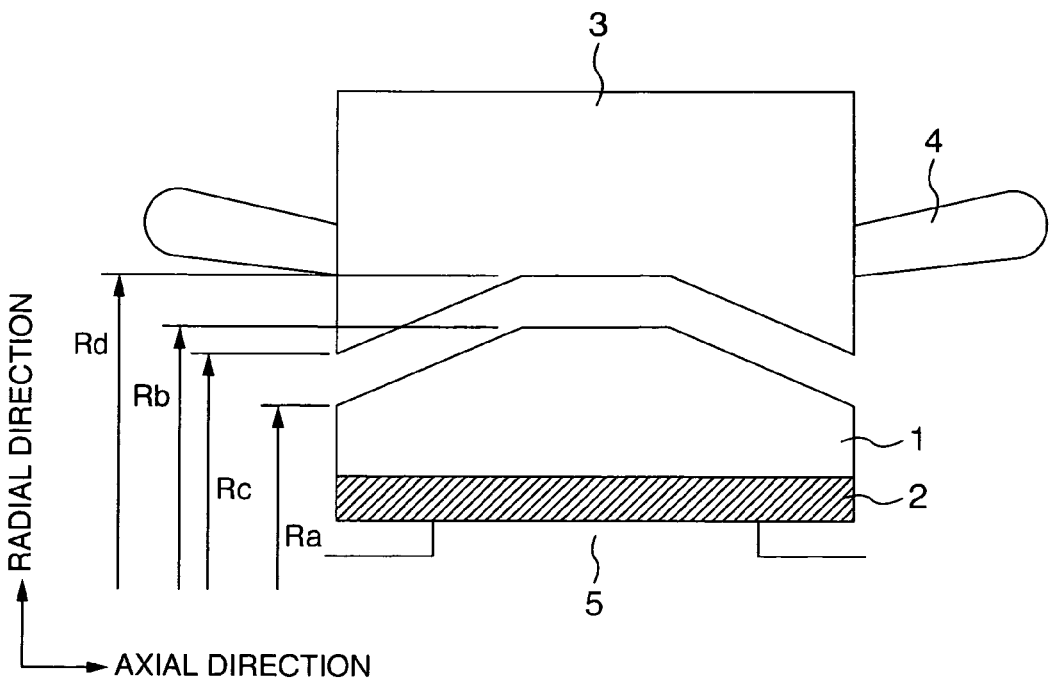
FIG. 2 is a view of a rotating machine of Example 2 of the present invention seen from a peripheral direction.
Figure 3:
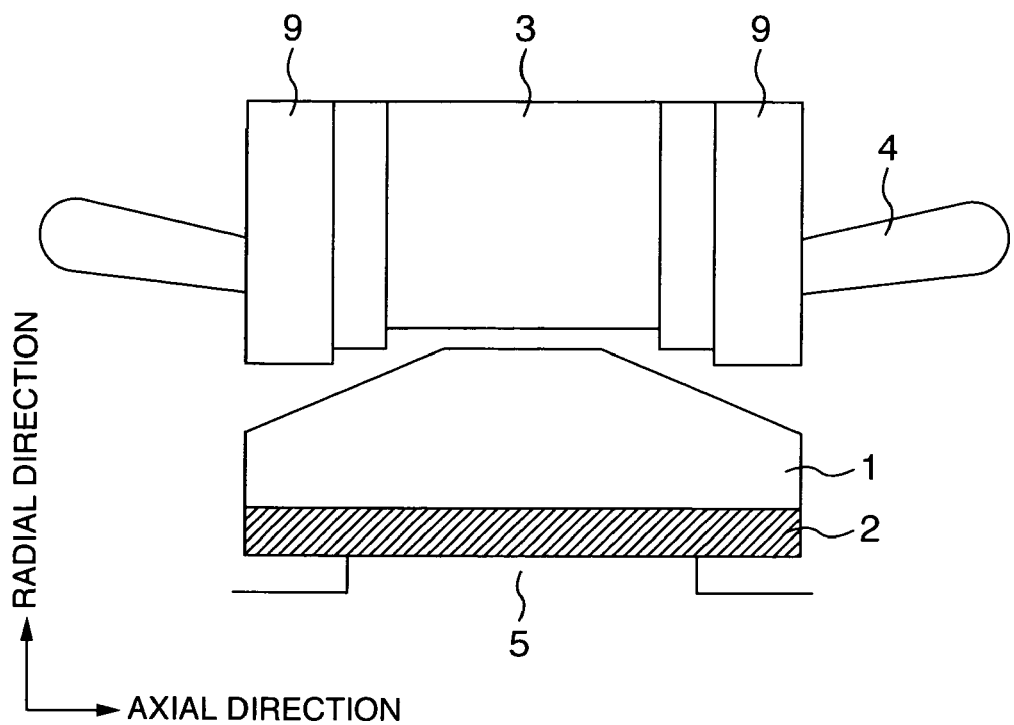
FIG. 3 is a view of the rotating machine of Example 2 of the present invention seen from a peripheral direction.

Hence, in Example 2 of the present invention, as shown in FIGS. 2 and 3, an inner diameter size Rc in an axial end portion of a stator iron core 3 is made smaller than an inner diameter size Rd in the axial center portion. As a result, a flux leakage in both axial ends is prevented, and a reduction of output is prevented.

Figure 19:
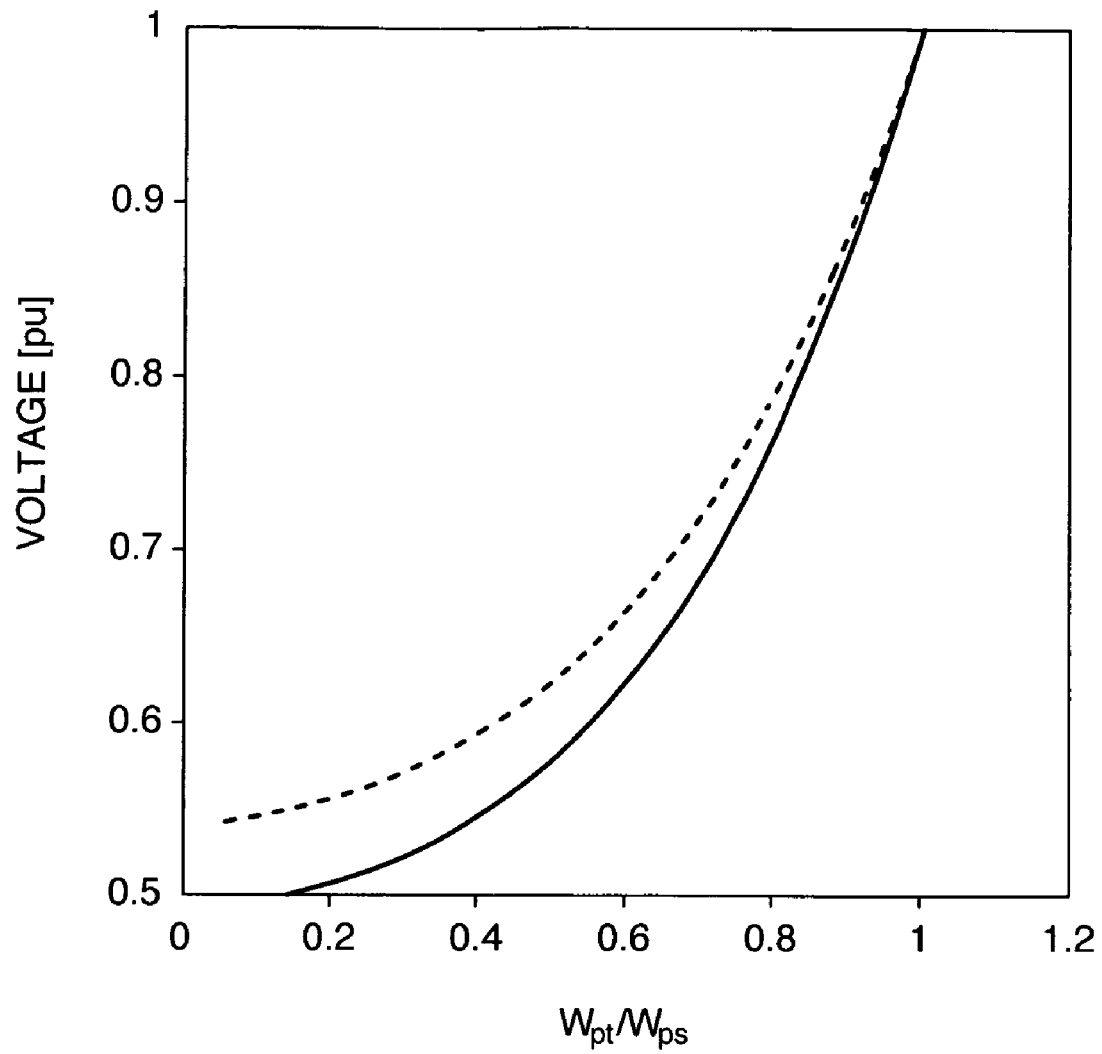
FIG. 19 is a view of a relationship of a voltage to a ratio of the upper surface diameter and the lower surface diameter of the pole shoe.
Figure 19:
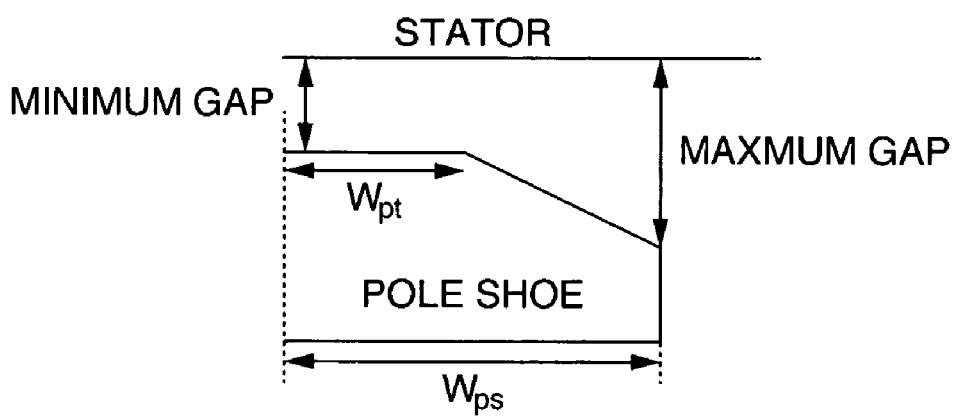

In FIG. 19, the solid line shows the output voltage as a function of ratio $W_{pt}/W_{ps}$ of the upper surface of diameter $W_{pt}$ and the lower surface diameter $W_{ps}$ of the pole shoe in case of the stator core 3 with same axial inner diameter at the axial end portion as at the axial center portion.

On the other hand, the broken line shows the output voltage as a function of ratio $W_{pt}/W_{ps}$ in case of a rotating machine with same air gap at the axial end portion as at the axial center portion.

As can be seen from FIG. 19, it is clear that as $W_{pt}/W_{ps}$ is made smaller, so the voltage is decreased. Hence, as shown in Example 2 of the present invention, if the inner diameter of the stator is continuously changed by the axial positions, so that the minimum gap at the axial end portion is made the same size as the minimum gap in the axial center portion, it is clear that the voltage can be improved as shown by the broken line in FIG. 19.

Further, though FIG. 2 shows a view in which the inner diameter of the stator iron core 3 is continuously changed by the axial positions, as shown in FIG. 3, a portion allowing the inner diameter of the stator iron core to change in incremental steps may be provided.

Figure 15:
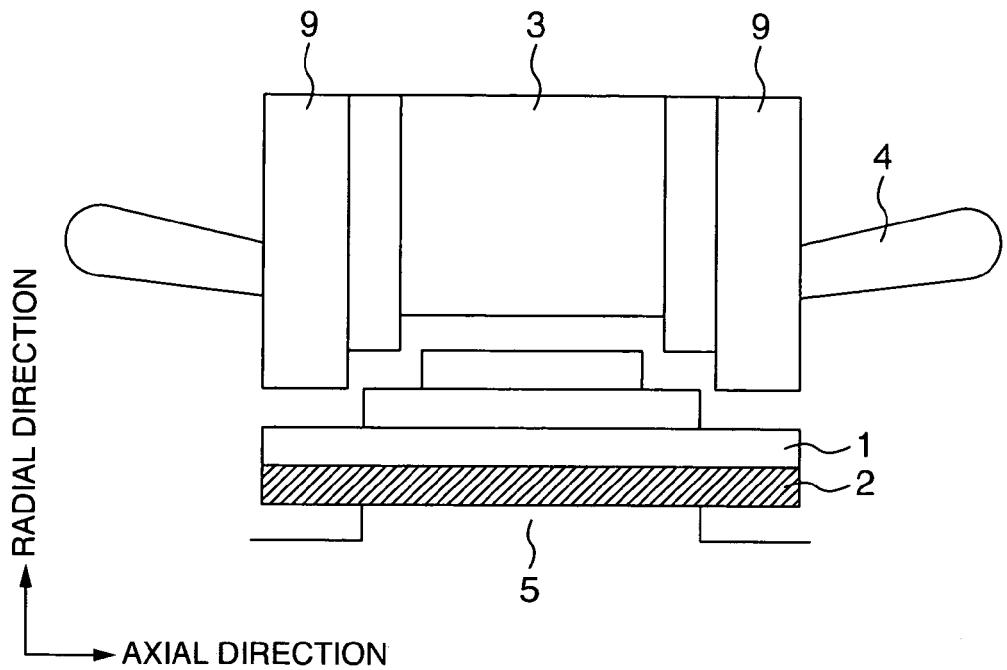
FIG. 15 is a view of a rotating machine seen from a peripheral direction which changes the outer diameter of a rotor of Example 2 in incremental steps.

Further, as shown in FIG. 15, the rotor is also provided with a portion allowing the outer diameter of the rotor to change in incremental steps.

Example 3

Figure 4:
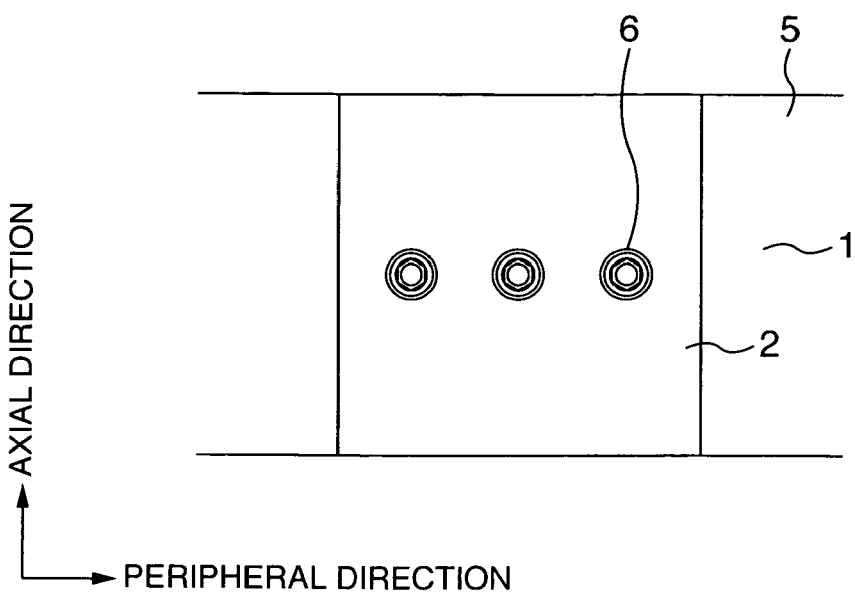
FIG. 4 is a view of a magnetic pole of a rotating machine shown in Example 3 of the present invention seen from a diameter direction.
Figure 5:
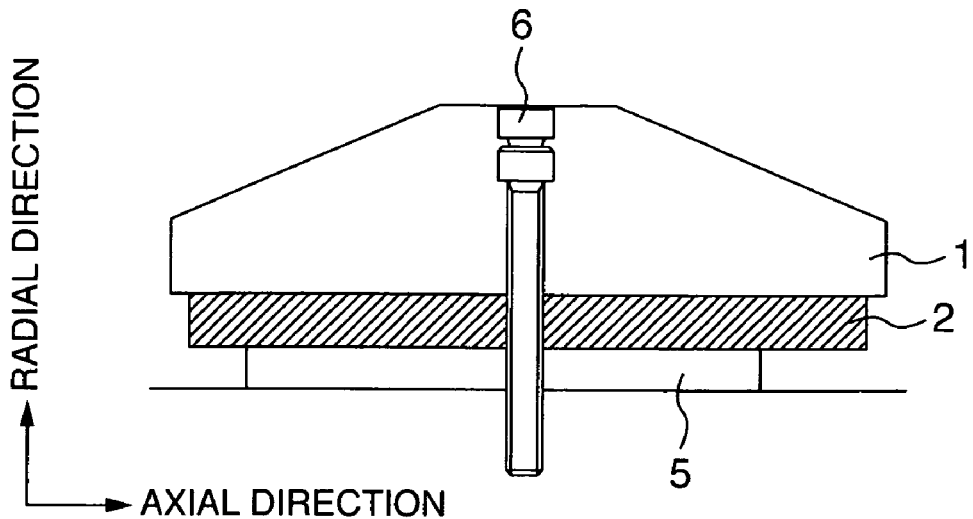
FIG. 5 is a view of a magnetic pole of the rotating machine shown in Example 3 of the present invention seen from a peripheral direction.
Figure 6:
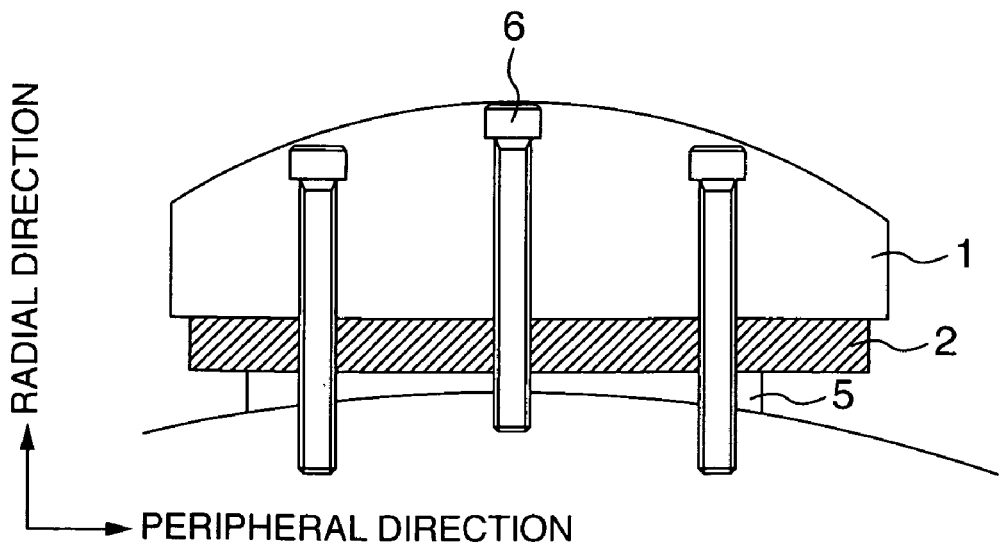
FIG. 6 is a view of a magnetic pole of the rotating machine shown in Example 3 of the present invention seen from an axial direction.

Example 3 of the present invention will be shown in FIGS. 4 to 6. The present example shows one example of a rotor of a rotating machine according to the present invention, and FIG. 4 is a view of a magnetic pole seen from a radial direction, FIG. 5 is a view seen from a peripheral direction, and FIG. 6 is a view seen from an axial direction, respectively. A pole shoe 1 and a permanent magnet 2 having a rectangular section are fastened to a pedestal 5 by a magnetic bolt 6. The pole shoe 1 has a smaller outer diameter in the axial center portion than in the axial end portion, thereby preventing displacement and peeling in axial both ends of the pole shoe due to a centrifugal force at the rotating time.

Here, when an attempt is made to hold the pole shoe and the permanent magnet by a plurality of bolts, a load is applied to a specific bolt, and therefore, the bolt or a bolt hole has possibilities of being broken. On the other hand, when the pole shoe having a square section in radial direction and the permanent magnet are fastened by single bolt, peeling is likely to become remarkable at both ends in the peripheral direction.

Example 4

Figure 7:
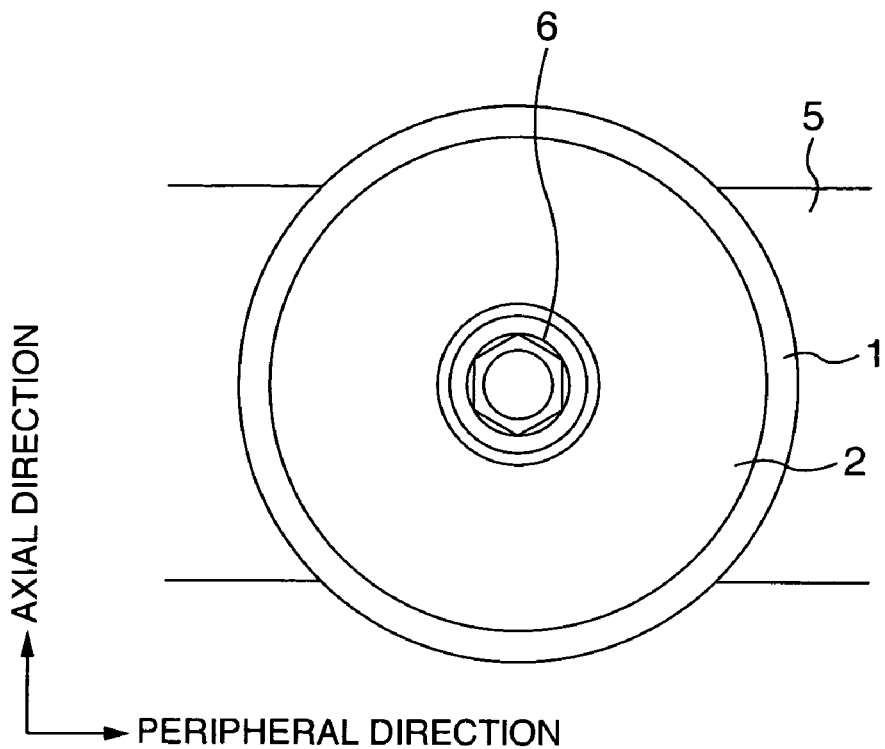
FIG. 7 is a view of a magnetic pole of a rotating machine shown in Example 4 of the present invention seen from a diameter direction.
Figure 16:
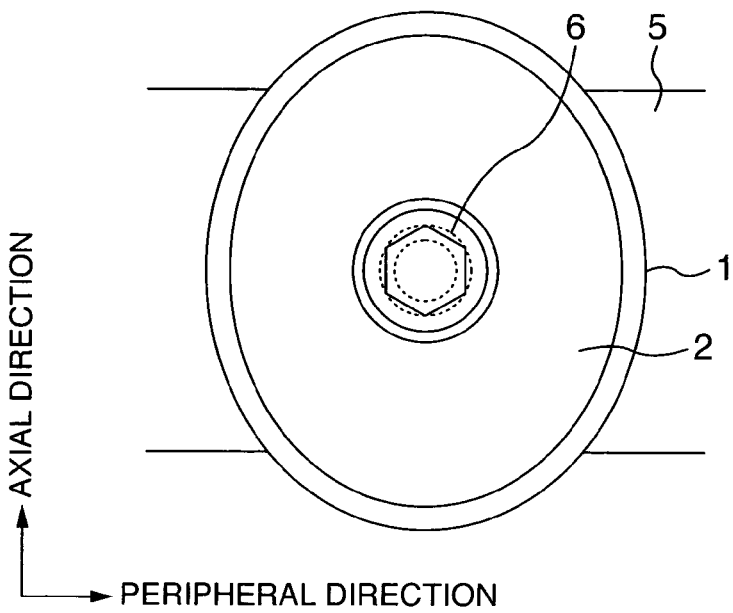
FIG. 16 is a view of a magnetic pole of a rotating machine seen from a diameter direction, which makes a pole shoe and a permanent magnet of Example 4 oval.
Figure 17:
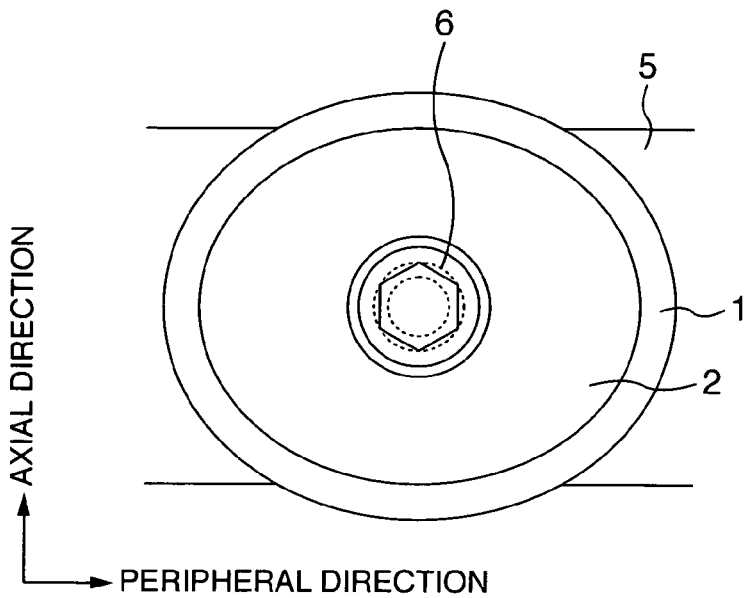
FIG. 17 is a view of a magnetic pole of a rotating machine seen from a diameter direction, which makes the pole shoe and the permanent magnet of Example 4 oval.

Hence, in Example 4 shown in FIGS. 7 to 9, the shapes in radial section of a pole shoe 1 and a permanent magnet 2 are made circular, and a bolt hole is provided in each center in the axial direction, and the pole shoe and the permanent magnet are fastened and fixed by a bolt 6 from the radial direction. By holding a pair of pole shoe and permanent magnet by a bolt, it is possible to prevent a load from being applied to a specific bolt. Further, by making the shape in section of the pole shoe and the permanent magnet circular, it is possible to prevent peeling and displacement from being developed not only in the axial direction but also in the peripheral direction. According to a sectional view seen from the radial direction as shown in FIG. 7, though the sections in radial direction of the pole shoe and the permanent magnet show a circular example, even if they are made oval as shown in FIGS. 16 and 17 due to limit in installation places, it is possible to obtain an effect of preventing peeling and displacement.

Example 5

In an axial end portion of a stator iron core whose inner size is made smaller than in the axial center portion, incoming magnetic flux from a magnetic pole to the stator iron core in the axial direction is increased. When the stator made of steel sheets punched out from iron core is configured by an iron plate punched out from a steel band, eddy current loss by this magnetic flux arises local heating.

Figure 10:
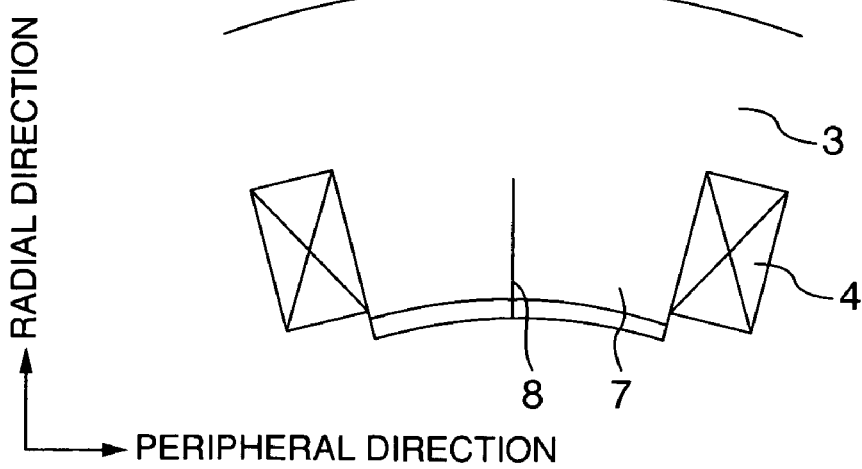
FIG. 10 is a view showing a stator iron core of Example 5 of the present invention.

Hence, in Example 5 of the present invention, as shown in FIG. 10, a tooth 7 of the stator iron core 3 is provided with a slit 8 so as to reduce an eddy current loss, thereby preventing a local overheating. Here, while an example is shown in which one slit is inserted for one tooth, the slit may be plural.

Example 6

Figure 11:
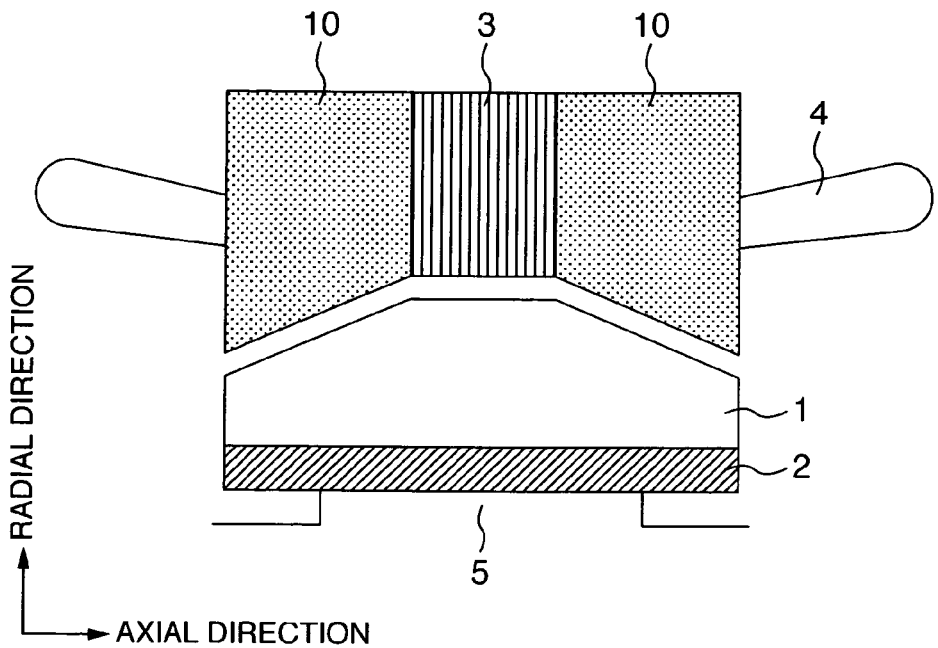
FIG. 11 is a view of a rotating machine of Example 6 of the present invention seen from a peripheral direction.
Figure 12:
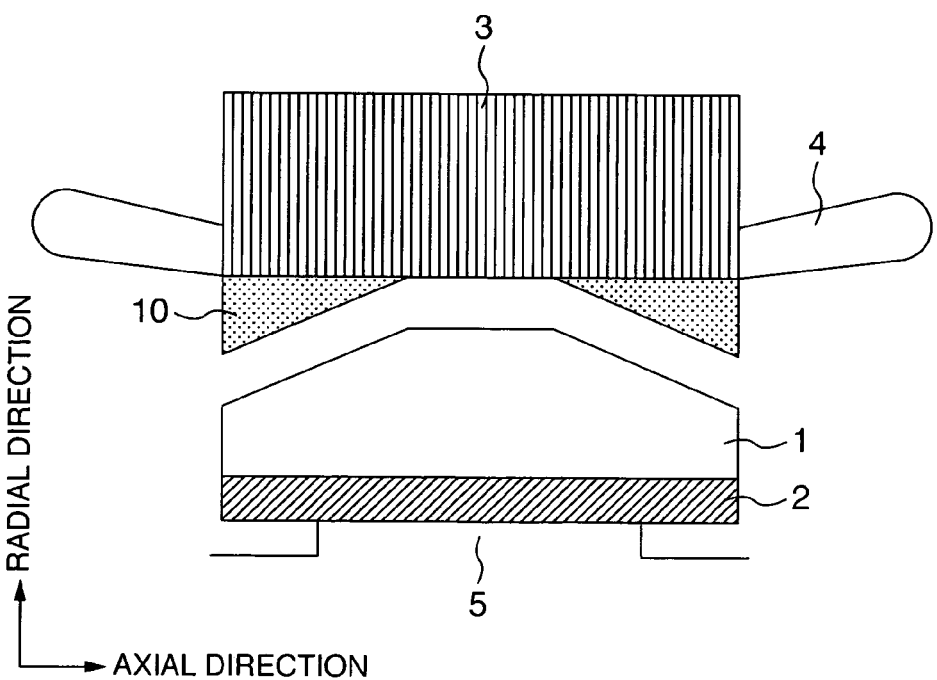
FIG. 12 is a view of the rotating machine of the Example 6 of the present invention seen from a peripheral direction.

Further, in Example 6 of the present invention as shown in FIGS. 11 and 12, both end portions of a stator iron core whose inner diameter is made smaller than in an axial center portion are configured by a stator iron core 10 formed by soft magnetic composites. As a result, eddy current loss is reduced, and a local overheating can be prevented.

Figure 18:
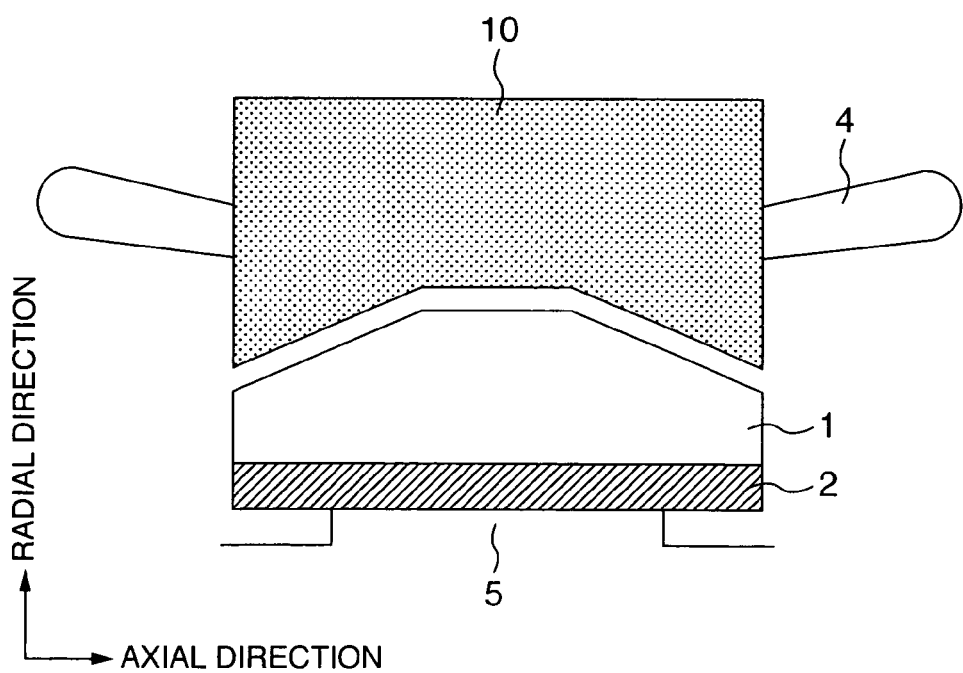
FIG. 18 is a view of the rotating machine of Example 6 of the present invention seen from the peripheral direction.

When the stator iron core is configured by an iron plate punched out from a steel band, to change the inner diameter of the stator iron core, it is necessary to prepare a plurality of cutting dies, and this leads to an increase in the number of manufacturing man-hour. In the present example, both end portions of the stator iron core different in the inner diameter are configured by the soft magnetic compound, so that the number of manufacturing man-hour can be reduced. FIG. 11 is a view in which both end portions of the stator iron core are all configured by the soft magnetic compound. However, as shown in FIG. 12, a teeth portion only may be configured by the stator iron core 10 formed by the soft magnetic compound. Further, as shown in FIG. 18, the entire stator iron core may be configured by the soft magnetic compound.

Example 7

Figure 13:
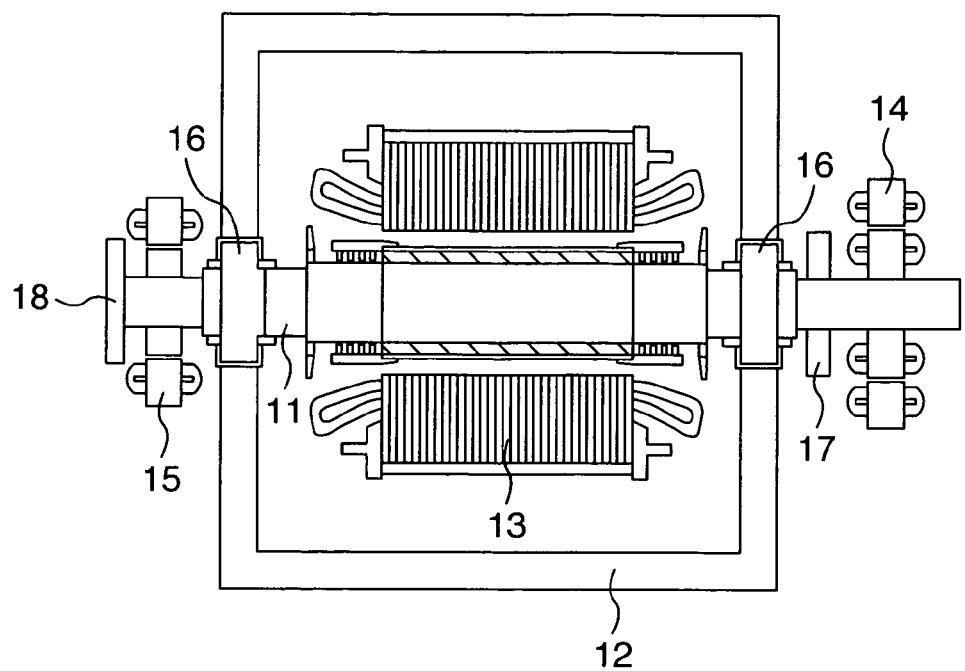
FIG. 13 is a view of a generating system of Example 7 of the present invention.
Figure 14:
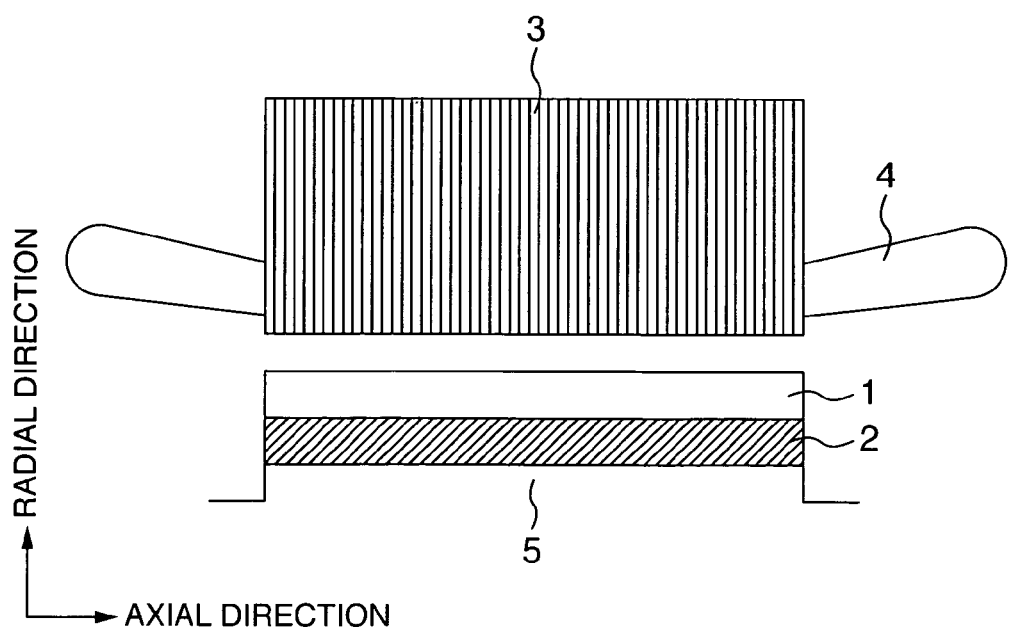
FIG. 14 is a view of a conventional rotating machine seen from a peripheral direction.

Example 7 of the present invention will be shown in FIG. 13. FIG. 13 shows a turbine generator system comprising a rotating machine of the present invention as a sub exciter. A generator shaft 11 is attached with a main exciter 14 and a sub exciter 15, and rotors of the main exciter and the sub exciter are configured to rotate accompanied with the rotation of the generator shaft. In the present example, the sub exciter is attached to the opposite side of the main exciter seen from the axial direction. As a result, it is possible to shorten an axial length of the entire turbine generator. However, when attaching to the opposite side in the axial direction, since the diameter of the rotating axis is large and the rotating speed is at a high speed, it is necessary to attach the sub exciter in a limited space between a coupling 18 and a bearing 16, thereby causing a problem.

Hence, in the present embodiment, any of the rotating machines according to the present invention is provided as the sub exciter, thereby solving the above described problem. That is, 1) Even when the rotating axis diameter is large and the rotating speed is in a rapid state, displacement and peeling are prevented by the shape of the pole shoe according to the present invention.

2) The output reduction is prevented by the shape of the stator iron core according to the present invention, and the size of the sub exciter is miniaturized, so that it can be attached in a limited space.

The above makes the configuration of the present example possible, so that the deterioration of the turbine generator system can be prevented, and the life thereof can be prolonged. Furthermore, by performing the bolt fastening from the radial direction, the fabrication and maintenance can be easily performed.

It will be further understood by those skilled in the art that the foregoing description has been made on embodiments of the invention and that various changes and modifications may be made in the invention without departing from the spirit of the invention and scope the appended claims.

The invention claimed is:

1. A rotating machine, wherein permanent magnets and pole shoes holding the permanent magnets at an outer diameter side of each permanent magnet are provided for a rotor, and an outer diameter size (Ra) in an axial end portion of the pole shoe is made smaller than an outer diameter size (Rb) in the axial center portion thereof;

wherein bolt holes are provided in an axial center position of the pole shoes, and by bolts, the pole shoes and the permanent magnets are held by fastening from a radial direction of the rotor;

wherein a radial section of any or both of the permanent magnets and the pole shoes is made circular or oval; and wherein each of the pole shoes has a shape of truncated circular or oval cone with an outer peripheral diameter decreasing in a radially outward direction of the rotor.

2. The rotating machine according to claim 1, wherein an outer diameter side of the rotor is provided with a stator iron core, and the entirety or a part of the stator iron core is formed by soft magnetic composites.

3. The rotating machine according to claim 1, wherein the outer diameter side of the rotor is provided with a stator iron core, and an inner diameter size (Rc) in an axial end portion of the stator iron core is made smaller than an inner diameter size (Rd) in an axial center portion thereof.

4. The rotating machine according to claim 1, wherein the outer diameter side of the rotor is provided with a stator iron core, and the inner diameter size is made smaller in incremental steps from the axial center portion to the axial end portion of the stator iron core.

5. The rotating machine according to claim 3, wherein a portion having an inner diameter size different from the inner diameter size in the axial center portion is formed by soft magnetic composites.

6. The rotating machine according to claim 3, wherein an axial inner part of the portion having the inner diameter size different from the inner diameter size in the axial center portion is formed by soft magnetic composites.

7. The rotating machine according to claim 1, wherein the outer diameter size of the rotor is provided with the stator iron core, and a teeth portion of the stator iron core is provided with slits.

8. A generating system, comprising a rotating machine as an exciter or a sub exciter, wherein a permanent magnet and a pole shoe holding the permanent magnet at an outer diameter side of the permanent magnet are provided for a rotor, and an outer diameter size (Ra) in an the axial end portion of the pole shoe is made smaller than an outer diameter size (Rb) in an axial center portion thereof;

wherein bolt holes are provided in an axial center position of the pole shoes, and by bolts, the pole shoes and the permanent magnets are held by fastening from a radial direction;

wherein a radial section of any or both of the permanent magnets and the pole shoes is made circular or oval; and wherein each of the pole shoes has a shape of truncated circular or oval cone with an outer peripheral diameter decreasing in a radially outward direction of the rotor.

9. The rotating machine according to claim 1, wherein a bevel of the shape of truncated circular or oval cone faces to a stator iron core in the radial direction.

10. The rotating machine according to claim 8, wherein a bevel of the shape of truncated circular or oval cone faces to a stator iron core in the radial direction.

* * * * *